United States Patent
Kiesbauer et al.

(10) Patent No.: US 9,068,665 B2
(45) Date of Patent: *Jun. 30, 2015

(54) PROCESS VALVE INCLUDING A FORCE MEASURING DEVICE

(71) Applicant: SAMSON AG, Frankfurt am Main (DE)

(72) Inventors: Joerg Kiesbauer, Eppertshausen (DE); Stefan Kolbenschlag, Darmstadt (DE); Karl-Bernd Schaertner, Nidderau (DE)

(73) Assignee: SAMSON AG, Frankfurt am Main (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/907,769

(22) Filed: May 31, 2013

(65) Prior Publication Data

US 2013/0340864 A1    Dec. 26, 2013

Related U.S. Application Data

(63) Continuation of application No. 13/189,183, filed on Jul. 22, 2011, now Pat. No. 8,474,334.

(30) Foreign Application Priority Data

Jul. 28, 2010 (DE) .................. 10 2010 036 711

(51) Int. Cl.
*G01L 1/02* (2006.01)
*F16K 37/00* (2006.01)

(52) U.S. Cl.
CPC ......... *F16K 37/0075* (2013.01); *F16K 37/0083* (2013.01)

(58) Field of Classification Search
CPC .................. F16K 37/0075; F16K 37/0083
See application file for complete search history.

(56) References Cited

U.S. PATENT DOCUMENTS

| 2,603,973 | A | | 7/1952 | Wallace | |
| 5,806,551 | A | * | 9/1998 | Meloul et al. | 137/1 |
| 6,695,282 | B2 | * | 2/2004 | Clemens et al. | 251/129.04 |
| 6,956,366 | B2 | | 10/2005 | Butzmann | |
| 8,474,334 | B2 | * | 7/2013 | Kiesbauer et al. | 73/862.582 |
| 2006/0218953 | A1 | | 10/2006 | Hirota | |
| 2008/0006101 | A1 | | 1/2008 | Nogami et al. | |

FOREIGN PATENT DOCUMENTS

| DE | 2747029 | 4/1979 |
| DE | 20009023 U1 | 10/2000 |
| DE | 102004006354 A1 | 8/2005 |

OTHER PUBLICATIONS

Office Action, German Patent and Trademark Office, Nov. 12, 2012, Applicant: Samson AG, German Patent Serial No. 102010036711.7, Munich Germany, pp. 1-6.

European Patent Office, Extended European Search Report, Jul. 3, 2013, pp. 1-6, Application No. 11174732.5-1751/2413009, Applicant: Samson Aktiengesellschaft.

* cited by examiner

*Primary Examiner* — Harshad R Patel
(74) *Attorney, Agent, or Firm* — Woodling, Krost and Rust

(57) ABSTRACT

The invention relates to a process valve (10) comprising a valve seat (14), a flow restrictor (12), a valve rod (16) and a drive unit (18) acting thereon, with a force measuring device (20, 44) being connected between said drive unit (18) and said flow restrictor (12). The invention is characterized in that said force measuring device (49) includes a spring (30, 46), and said force measuring device (29, 44) comprises a travel measuring device (38, 42, 50, 52) so as to allow the force acting on it to be determined based on the change in the deflection of the spring (30, 46) caused by the force acting on it.

16 Claims, 2 Drawing Sheets

PROCESS VALVE INCLUDING A FORCE MEASURING DEVICE

This patent application is a continuation of co-pending U.S. patent application Ser. No. 13/189,183 filed Jul. 22, 2011. This continuation patent application claims the benefit of, and priority to, co-pending U.S. patent application Ser. No. 13/189,183 filed Jul. 22, 2011. U.S. patent application Ser. No. 13/189,183 filed Jul. 22, 2011, claims the benefit of, and priority to, German patent application number: 10 2010 036 711.7-12, filed on Jul. 28, 2010. German patent application number 10 2010 036 711.7-12, filed on Jul. 28, 2010, is incorporated herein in its entirety by reference hereto.

The present invention relates to a process valve including a force measuring device.

Process valves are used in the process industry for restricting fluid flows. For this purpose, a flow restrictor will be rotated or translationally moved within a defined aperture of a valve seat. The force required for this purpose is generated by a pneumatic or an electric drive. The drive and the flow restrictor are usually coupled by means of a valve rod.

It is important to know the exact force applied so as to be able to assess the process state on the one hand, and the state of the valve or the actuator, on the other. In this regard, a method and a device for assessing the maintenance condition are known from prior art document DE 10 2004 006 354 A1 for which purpose the forces occurring in the valve rod are measured.

For measuring the force, the prior art proposes attaching a strain gauge to the valve rod or a weighing cell which is in turn operatively connected to the valve rod. The strain gauge will then measure the change in the surface area of the material caused by the deformation.

The shortcoming of this design is that it is very costly since sophisticated electronic amplifiers will have to be used owing to the low electrical output signal so as to obtain a useful signal. Besides the high cost, the high current consumption will negatively affect the range of application of the valve. Process valves are often used in a "potentially explosive environment", with any electronics used in such environment having to be of a type that prevents explosions—which is in stark contrast to the high current consumption requirement.

Furthermore, it is known to measure the driving pressure in a pneumatic drive or the power input in an electric drive. However, the disadvantage of this method is that the measuring result might be distorted due to friction forces within the system. Moreover, in the case of a pneumatic drive, fast peak pressures cannot be detected owing to the inertia of the sensors and the compressibility of the drive medium.

It is the object of the present invention to provide a device which is capable of measuring the force applied to a valve body in a fast and reliable way, with low current consumption, at the same time avoiding the above mentioned disadvantages.

In a known design, a process valve comprises a drive unit which is connected to a valve body via a valve rod, said drive unit urging said valve body into a valve seat so as to interrupt a fluid flow through said process valve. Moreover, it includes a force measuring device that is operatively connected to the valve rod. This force measuring device can be used to determine the force with which the valve body is urged into the valve seat.

According to the invention, the force measuring device comprises a spring and a travel measuring device, with the force applied to the spring being measured on the basis of the change in travel by means of a travel measuring device. The force acting on the spring can thus be concluded from the known spring constant. The travel measuring device determines the deflection of the spring by measuring the change in position of a measuring point with respect to a reference point. Determining the change in position involves very little measuring effort compared to the measuring methods of the prior art.

A spring as defined in the present invention is essentially an elastically deformable body of any geometric shape which will recover passively, with the geometry and the material of said body being adaptable to the requirements of the available space and the demands made on the spring characteristic. The spring effect is accomplished in particular by the geometric shape of the spring. Measuring a force using a spring in a process valve allows high forces to be measured in a small available space. The setup furthermore features high dynamics and a quick response behaviour.

In another advantageous embodiment, a mechanical transmitter or adapter, in particular a lever transmission, is provided for the transmission of the spring deflection to the travel measuring device which will magnify the mechanical measuring path. This is advantageous in that a higher measuring accuracy will be obtained and a better output signal can be ensured without having to use electrical amplifiers.

According to another embodiment of the invention, the force measuring device may be directly mounted on the flow restrictor on the valve rod. Alternatively, however, the force measuring device may also be accommodated in the valve rod or in the drive.

In yet another advantageous embodiment which exploits the anisotropic magnetoresistive effect, the travel measuring device is formed as an AMR sensor and magnet in such a way that a change of travel of the magnet with respect to the sensor will result in a vast change of direction of the field strength of the magnet at the site of the sensor. The magnet will be moved in relation to the deflection of the spring.

According to an advantageous embodiment, a permanent magnet in particular is mounted on the end of a lever which moves opposite the AMR sensor, and the deflection of the spring is mapped to the second end of the lever. The lever arm having the permanent magnet attached to it is longer than the lever arm indicating the spring travel. This results in a mechanical amplification of the travel.

Within the scope of the invention, the travel measuring device may also be formed based on other principles of travel measurement, for example using a potentiometer, a differential transformer, optical means or a sensor having a crosswise armature.

The measuring range may be adapted using different springs having different spring constants, with the springs being chosen such that the mechanical travel distance remains the same. This is advantageous in that the same travel measuring device can be used to measure different force ranges.

An overload resistance of the mechanical spring is accomplished by forming corresponding contact surfaces. The contact surfaces are formed as stops and will limit the deflection of the spring.

Adjusting the contact surfaces also allows certain measuring ranges determined by means of such overload bodies to be faded out so as to obtain higher accuracy in the remaining measuring range. For example, the closed or open position of the valve may thus be adapted to the sensor range. Consequently, it will only be possible to measure the force in a limited range of the valve position in the closed range and 20% above it, for example.

In yet another embodiment, the spring may be in the form of an S-shaped solid body. Besides a spring element, such an S-shaped solid body may also already include a lever and a travel measuring device. This will result in a particularly compact design.

A force measuring device may be designed so as to include a non-linear force-travel characteristic of the spring. A non-linear force-travel characteristic will allow especially the major portion of the sensor range to be focussed on particularly relevant valve positions.

According to yet another aspect of the invention, the force measuring device according to the invention may also be used for process valves which are formed as pivotal actuators.

Further advantages, features and potential applications of the present invention may be gathered from the description which follows, in conjunction with the embodiments illustrated in the drawings.

Throughout the description, the claims and the drawings, those terms and associated reference signs will be used as are notable from the enclosed list of reference signs. In the drawings FIG. 1 is a view of a process valve having a force measuring device;

Figure 1:
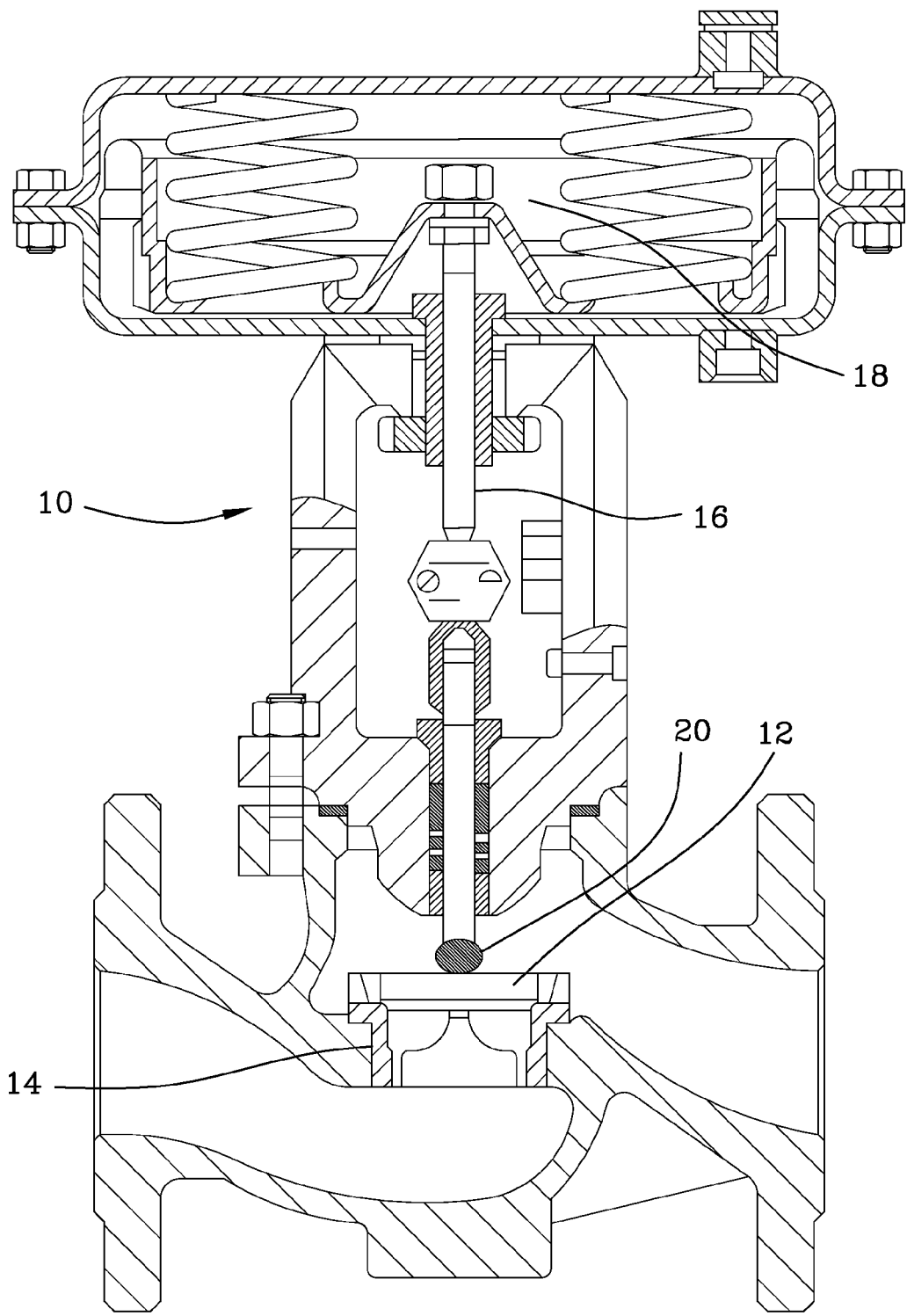

FIG. 1 shows a process valve 10 including a force measuring device 20 according to the invention. The process valve 10 illustrated includes a valve body 12 which controls the flow via the depth by which it is pressed into a valve seat 14. Mounted between the valve rod 16 and the valve body 12 is the force measuring device 20. The close location of the force measuring device 20 to the valve body 12 has the advantage that the friction of the valve rod 16 will not influence the force measurement. The process valve 10 illustrated is controlled by a pneumatic drive 18. Recording the force generated by the pneumatic drive 18 and acting on the valve body 12 allows a reliable assessment to be made as regards the state of the process valve 10.

Figure 2:
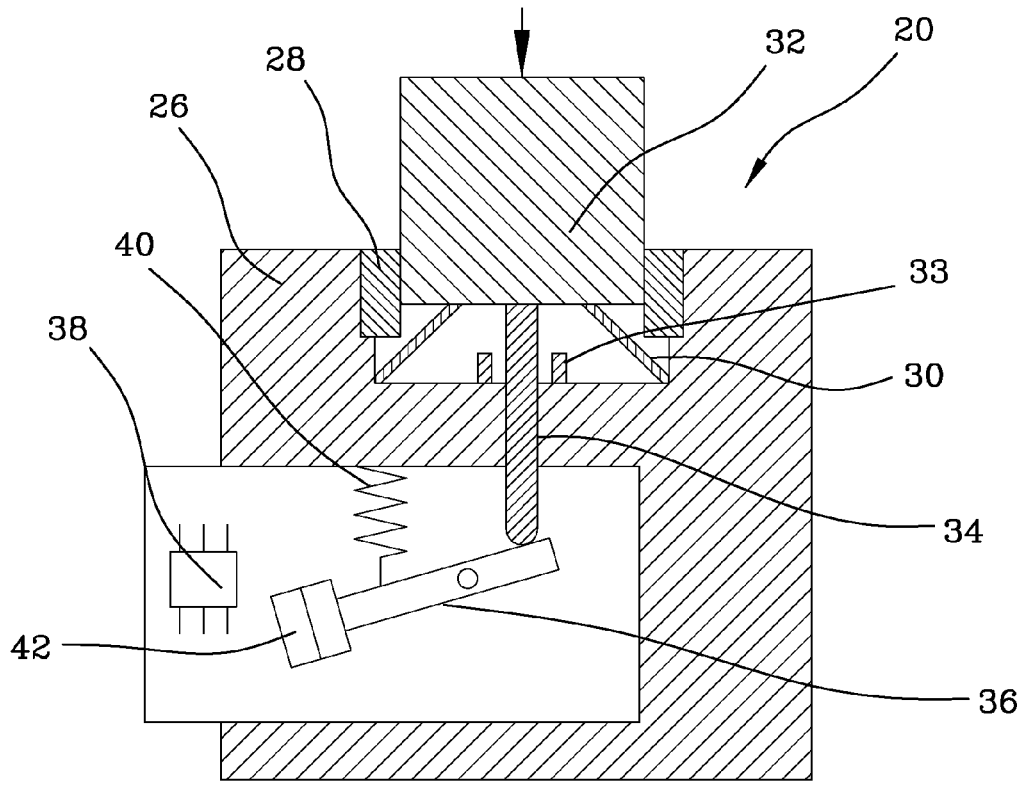
FIG. 2 is a schematic view of a force measuring device.

FIG. 2 shows an embodiment of the measuring device 20 comprising a housing 26 which accommodates a piston 32 that is movably guided in an axial direction by slide bushes 28. In order to prevent the piston from jamming or the force actually applied from being distorted, a slide bush 28 is mounted around the piston 32 within the force measuring device 20. The piston 32 is supported with respect to the housing 26 by means of a disk spring 30. Moreover, a contact surface 33 is provided between the housing 26 and the piston 32. The contact surface 33 restricts the deflection of the spring 30 which in turn limits the spring characteristic to a certain force range, thus increasing the resolution in this range. A force acting on said piston 32 will cause the disk spring 30 to be moved as a function of its spring characteristic. This movement will be transmitted to a lever arm 36 via a pressure pin 34. In this case, the tip of the pressure pin represents the measuring point, for example, whose change in position is to be measured. The lever arm 36 is suspended such that the pressure pin 34 will contact the shorter end of the lever arm 36. Mounted on the longer portion of said lever arm 36 is a permanent magnet 42. The latter will perform a circular movement about the supporting point of the lever 36 during movement of the piston. The movement of the permanent magnet 42 will occur relative to an AMR sensor 38 which is firmly connected to the housing. Depending on the position of the permanent magnet 42, the magnetic field at the site of the AMR sensor 38 will change, thus allowing the position of the permanent magnet 42 to be determined very precisely. The lever arm 36 thus acts to mechanically amplify the actual movement of the piston 32.

Mechanical amplification of the relative movement eliminates the need for sophisticated high-quality electronic amplifiers—which results in enormous cost-savings. As the AMR sensor 38 is capable of determining the mechanically amplified travel with sufficient accuracy and without any problems, no strain gauges that have the above mentioned shortcomings will be required, either. The valve body positioned at the bottom of the force measuring unit 20 by the movement transmitted from the valve rod to the piston will largely be moved without any counterforce until the valve body contacts the valve seat. If the downforce of the drive exceeds a certain threshold value of the spring characteristic, this will cause the valve rod to continue its movement relative to the valve body. This allows the applied force to be determined as a function of the spring characteristic.

Figure 3:
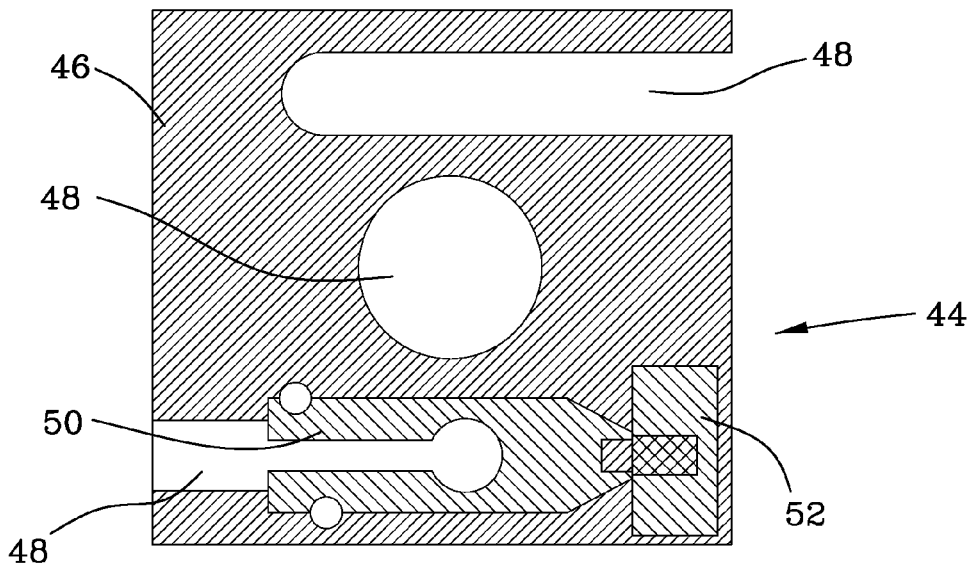
FIG. 3 is a view of a spring in the form of an S-shaped solid body.

FIG. 3 shows part of a force measuring device 44 comprising a body 46 which is more or less S-shaped owing to recesses 48 provided therein. Reducing the strength of the solid material will thus result in a spring having an associated spring characteristic as defined in the present invention. In this embodiment, a mechanical travel transmitter 50 is mounted between the lower and the central leg of the S-shaped body 46 in such a way that the applied force will deform the S-shaped body 46. This embodiment ultimately measures the change in position of a first lever bearing compared to a second lever bearing. The relative change in position of the two lever bearings will cause the lever 50 to pivot. Depending on the length of the lever 50, the travel will become longer compared to the change of the distance between the two lever bearings. The distance travelled by the free end of the transmitter element 50 will be measured by means of a sensor element 52.

The measurement is preferably performed in an optical manner. This embodiment has the particular advantage that the sensor can be mounted directly on the spring element which will result in a considerable reduction of required components. As both the top and the bottom of the S-shaped body 46 are threaded, the embodiment illustrated in FIG. 3 is particularly suited for mounting the force measuring device 44 between two parts of a valve rod.

List Of Reference Signs 10 process valve
12 flow restrictor
14 valve seat
16 valve rod
18 drive
20 force measuring device
26 housing
28 slide bush
30 disk spring
32 piston
33 contact surface
34 pressure pin
36 lever arm
38 AMR sensor
40 return spring
42 permanent magnet
44 force measuring device
46 solid body
48 recesses
50 transmitter or lever
52 sensor element

The invention claimed is:

1. A process valve, comprising:
   a valve seat;
   a flow restrictor;
   a valve rod;
   a drive, said drive moves said valve rod;
   a force measuring device connected between said drive and said flow restrictor, said force measuring device determining the force required to move said flow restrictor;
   said force measuring device includes a spring;
   said force measuring device includes a travel measuring device;
   said travel measuring device includes a measuring point and a reference point;
   said travel measuring device measures the change in position of said measuring point with respect to said reference point; and,
   said force measuring device determining the force by the change in the deflection of said spring.

2. The process valve as claimed in claim 1 further comprising an amplifying lever, said amplifying lever resides between said spring and said travel measuring device.

3. The process valve as claimed in claim 1 wherein said travel measuring device comprises an anisotropic magnetoresistance sensor.

4. The process valve as claimed in claim 1 wherein said spring is in the form of an S-shaped body with recesses therein.

5. The process valve as claimed in claim 1 wherein said spring is a disk spring.

6. A process valve, comprising:
   a valve seat;
   a flow restrictor;
   a valve rod;
   a drive, said drive moves said valve rod;
   said valve rod includes a first portion and a second portion;
   a force measuring device resides between said first portion and second portion of said valve rod, said force measuring device determining the force required to move said flow restrictor;
   said force measuring device includes a spring;
   said force measuring device includes a travel measuring device;
   said travel measuring device includes a measuring point and a reference point;
   said travel measuring device measures the change in position of said measuring point with respect to said reference point; and,
   said force measuring device determining the force by the change in the deflection of said spring.

7. The process valve as claimed in claim 6 wherein said travel measuring device comprises an anisotropic magnetoresistance sensor.

8. The process valve as claimed in claim 6 wherein said spring is in the form of an S-Shaped body with recesses therein.

9. The process valve as claimed in claim 6 wherein said spring is a disk spring.

10. A process valve, comprising:
    a valve seat;
    a flow restrictor;
    a valve rod;
    a drive, said drive moves said valve rod;
    a force measuring device connected between said drive and said valve rod, said force measuring device determining the force required to move said flow restrictor;
    said force measuring device includes a spring;
    said force measuring device includes a travel measuring device;
    said travel measuring device includes a measuring point and a reference point;
    said travel measuring device measures the change in position of said measuring point with respect to said reference point; and,
    said force measuring device determining the force by the change in the deflection of said spring.

11. The process valve as claimed in claim 10 wherein said travel measuring device comprises an anisotropic magnetoresistance sensor.

12. The process valve as claimed in claim 10 wherein said spring is in the form of an S-shaped body with recesses therein.

13. The process valve as claimed in claim 10 wherein said spring is a disk spring.

14. A process valve, comprising:
    a valve seat;
    a flow restrictor;
    a valve rod;
    a drive, said drive moves said valve rod;
    a force measuring device connected between said flow restrictor and said valve rod, said force measuring device determining the force required to move said flow restrictor;
    said force measuring device includes a spring;
    said force measuring device includes a travel measuring device;
    said travel measuring device includes a measuring point and a reference point;
    said travel measuring device measures the change in position of said measuring point with respect to said reference point; and,
    said force measuring device determining the force by the change in the deflection of said spring.

15. The process valve as claimed in claim 14 wherein said travel measuring device comprises an anisotropic magnetoresistance sensor.

16. The process valve as claimed in claim 14 wherein said spring is in the form of an S-shaped body with recesses therein.

* * * * *